United States Patent

Eccles, Jr.

[15] 3,650,150

[45] Mar. 21, 1972

[54] TIRE PRESSURE INDICATION

[72] Inventor: Willet Lawrence Eccles, Jr., 1709 Hansconi Drive, South Pasadena, Calif. 91030

[22] Filed: Jan. 28, 1970

[21] Appl. No.: 6,457

[52] U.S. Cl. ...................................................... 73/146.8
[51] Int. Cl. ............................................................ B60c 23/00
[58] Field of Search .......................... 73/146.8, 146.2, 146.3; 137/227; 116/34 R

[56] References Cited

UNITED STATES PATENTS

| | | | |
|---|---|---|---|
| 1,237,512 | 8/1917 | Harrison et al. | 73/146.2 |
| 1,582,523 | 4/1926 | Larson et al. | 137/227 |
| 2,479,915 | 8/1949 | Eastman | 116/34 |
| 3,230,968 | 1/1966 | Struby | 73/146.8 X |

*Primary Examiner*—Donald O. Woodiel
*Attorney*—Christie, Parker & Hale

[57] ABSTRACT

A tire pressure indicator is disclosed in the form of an improved valve stem. A cap is mounted on the valve stem and an elastically extensible member responsive to the pressure within the tire is provided between the rigid portion of the stem and the portion on which the cap is mounted so that the cap moves relative to the rigid portion of the stem in response to tire pressure. A measuring indication or plurality of indications are provided on the stem adjacent the end of the skirt of the cap for indicating proper tire pressure. In one embodiment and the measuring indicator is on a sleeve threaded on the stem and having a detent for locking the sleeve in a selected position indicative of tire pressure. In another embodiment a detent in the cap permits adjustment to a selected pressure as measured in fixed indicia on the valve stem. A rubber or plastic bellows either alone or supplemented by a metal spring is preferably employed as the elastically extensible member.

11 Claims, 4 Drawing Figures

PATENTED MAR 21 1972 3,650,150

INVENTOR.
WILLET LAWRENCE ECCLES JR.
BY
Christie, Parker & Hale
ATTORNEYS

TIRE PRESSURE INDICATION

BACKGROUND

It is readily apparent that an indication of proper tire inflation is highly desirable in order to provide safety long tire wear and comfortable ride in an automobile. The shape of the tire in contact with the ground is not a sufficient measure of proper tire inflation and regular checking of tire pressure is desirable. Such checking is normally accomplished by a tire gauge at the time the vehicle is being refueled; however, such service is often neglected by the station attendants.

Automobile manufacturers predicate their suspension dynamics (springs, shocks, etc.) on recommended tire pressures, and it is common practice for them to recommend different pressures for front and rear tires. It is also important to tire manufacturers that their products be used within set limits, so that their warranted performance figures are supportable and affordable. Therefore, because few service station personnel volunteer to check tire pressures, and because many of their gauges become inaccurate with wear, it is desirable to have a visual check system for the owner to detect whether the tires are too soft or too hard and, therefore, in need of attention. This kind of system will also allow the car owner to assure himself of the condition of his tires before, during, and after a long trip, during which it is possible for dangerous pressures to build under high temperature conditions, as well as for unseen road hazards to damage a tire.

Several devices have been provided in the prior art for more or less permanent attachment to a tire for continuously or intermittently indicating internal pressure. Most of these devices are removable and attached to a conventional valve stem assembly, either on an inner tube or on the stem insert of a tubeless tire. Such devices are easily lost, stolen or damaged. Many such devices indicate only low tire pressure and do not signal overinflation which can be harmful or undesirable. Some of the tire indicating devices are intended to be integral with the valve stem assemblies, however, such devices often tend to produce a substantial loss of pressure and require frequent refilling of the tire. Other indicators integral with the stem require a large number of special parts and are therefore relatively expensive.

It is therefore desirable to have a relatively inexpensive tire pressure indicator integral with the valve stem for avoiding pressure losses and for reliable operation.

BRIEF SUMMARY OF THE INVENTION

Thus, in practice of this invention according to a preferred embodiment, there is provided a stem in fluid communication with a tire interior. A cap is mounted on the stem and a measuring indication is provided on the stem adjacent an end skirt of the cap. An elastically extensible member responsive to tire pressure is provided between the stem and the cap for effecting relative movement of the cap and the stem for displacing the end of the cap relative to the indication, thereby showing the presence or absence of proper tire inflation.

DRAWINGS

These and other features and advantages of the present invention will be appreciated as the same becomes better understood by reference to the following detailed description of a presently preferred embodiment when considered in connection with the accompanying drawings wherein.

Throughout the drawings like reference numerals refer to like parts.

DESCRIPTION

Figure 1:
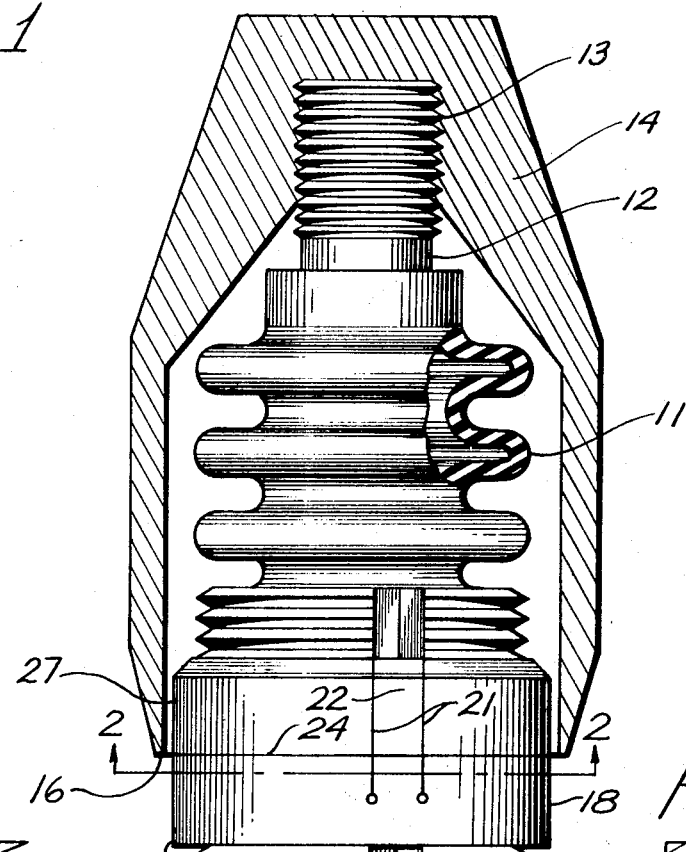
FIG. 1 illustrates in partial cross section a valve stem constructed according to principles of this invention.

FIG. 1 illustrates a tire pressure indicator integral with a tire valve stem constructed according to principles of this invention. As illustrated in this embodiment, there is provided a hollow stem 10 in fluid communication with the interior of a tire. The stem may be either a stem affixed to an inner tube for use in tube type tires, or may have a conventional base for insertion in the rim of a tubeless tire. The stem 10 is typically made of rubber and has a sufficiently thick wall to be substantially rigid in response to normal inflation pressures in a tire.

At the outer end of the stem 10 a flexible rubber bellows 11 is formed integral with the stem so that there is no air leakage therebetween. The thickness and elasticity of the rubber forming the bellows 11 is selected so as to provide a longitudinal extension of the bellows in response to inflation pressure within the tire. Thus, when the tire is uninflated the bellows 11 is at its rest position, relatively collapsed, and when the tire is inflated the internal pressure within the bellows 11 causes it to lengthen by an amount in direct relation to the tire pressure.

Mounted on the end of the bellows 11 and preferably formed integral therewith in the process of originally molding and vulcanizing the stem is a conventional metal valve and core mounting member 12 having threads 13 on the outside thereof. The metal mounting member 12 is also internally threaded for receiving a conventional tire inflation valve (not shown). The metal mounting member 12 may extend through the bellows 11 but is free from attachment to the interior of the stem 10 so that longitudinal movement of the bellows 11 is in no way restricted by the mounting member.

Threaded on the threads 13 on the valve mounting member is a cup-shaped cap 14 that has sides extending along the length of the device so as to surround the bellows 11, and end in an edge or skirt 16 adjacent the stem 10. As will appear hereinafter, during normal use of the pressure indicator the cap 14 is screwed down tightly on the mounting member 12 so as to have a fixed position relative thereto.

Figure 2:
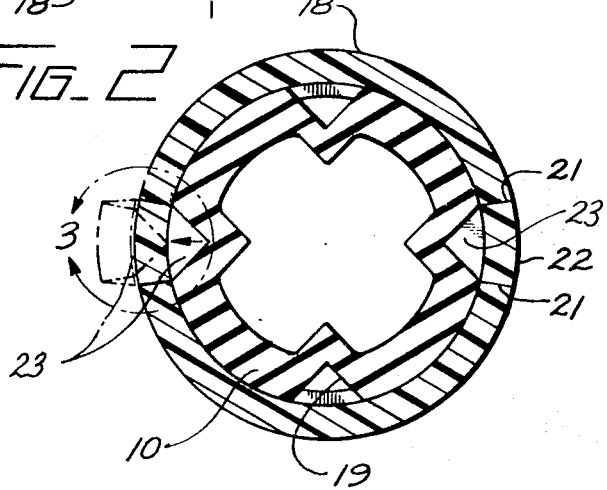
FIG. 2 illustrates in transverse cross section means for adjusting the pressure indicator.

The stem 10 is provided with threads 17 along its length and an internally threaded indicator ring 18 is screwed onto the stem. The stem 10 is also provided with four longitudinally extending grooves 19 in the outside surface and interrupting the threads 17. The ring 18 includes at one or two locations a pair of parallel slits 21 defining the edges of a longitudinally extending strip 22 having an inner end integral with the balance of the ring 18. An inwardly extending tip 23 on the outer end of the strip 22 engages one of the grooves 19 on the stem 10 when aligned therewith to serve as a detent for preventing accidental rotation of the ring 18 on the stem. When the ring 18 is deliberately caused to rotate by hand, the tip 23 rides out of the groove 19 since the sides are tapered, and the strip 22 elastically deforms as seen in phantom in FIGS. 2 and 3, so that the ring 18 can be moved along the threads 17 on the stem.

The ring 18 is provided with a measuring indication 24 which, when the tire is properly inflated, is adjacent the end skirt 16 of the cap. The indication 24 is readily provided as a demarcation between one color on an outer portion 26 of the ring 18 and a contrasting color on an inner portion 27 of the ring. Thus it will be apparent that in such an embodiment when the proper tire inflation is present the indicating line 24 is just visible beyond the skirt 16 of the cap, and when the tire is under inflated the bellows is relatively collapsed and the indication 24 is hidden by the edge of the cap. Similarly, if the tire is over inflated the extensible bellows 11 is stretched to a greater extent and the measuring indication 24 will be exposed a substantial distance beyond the end skirt of the cap for a clear indication of over inflation. If desired, a pair of indications can be provided on the ring to clearly distinguish over or under inflation from the proper pressure. If desired longitudinal slits in the skirt can be used to see an indicator line on the stem so that the cap shows a degree of under inflation.

Since different tires, and even the same tires in different applications, require different inflating pressures, it is desirable to have a means for adjusting the indication of inflation. It is for this reason that the ring 18 is threaded on the stem 10. In order to employ the device illustrated in FIG. 1, the tire is initially inflated to the proper value with the ring 18 threaded on the stem to approximately its desired position. After proper inflation the cap 14 is threaded onto the mounting member 12 until it is seated so as to have a fixed position. The ring 18 is then rotated on the threads 17 until the indication 24 is adjacent the end skirt 16 of the cap, which serves as an indication of proper tire inflation. The detents 23 operating in the grooves 19 prevent inadvertent rotation of the ring 18 and change in calibration of the pressure indicator. The presence or absence of proper tire inflation is then readily noted by merely observing the position of the cap skirt relative to the indication 24. If it is noted that the tire inflation is not in the proper range it is only necessary to remove the cap 14 and adjust the tire pressure in the conventional manner and then reinstall the cap 14 until it is tight on the mounting member 12. There is no additional need for adjusting the indicator ring 18.

With such an arrangement the elastically extensible bellows 11 is integral with the stem 10 and mounting member 12 so that no air leakage occurs and the tire is inflated through the mounting member in the conventional manner so that no changes are needed in conventional tire valves or in inflating or measuring equipment. The cap 14 extends completely over the bellows 11 so that the elastically extensive members protected from accumulations of dirt, water, or the like which might affect its operation.

Figure 3:
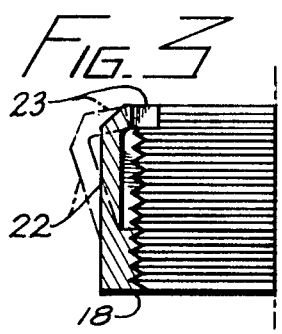
FIG. 3 is a fragmentary view of a detent for the adjusting means of FIG. 2.
Figure 4:
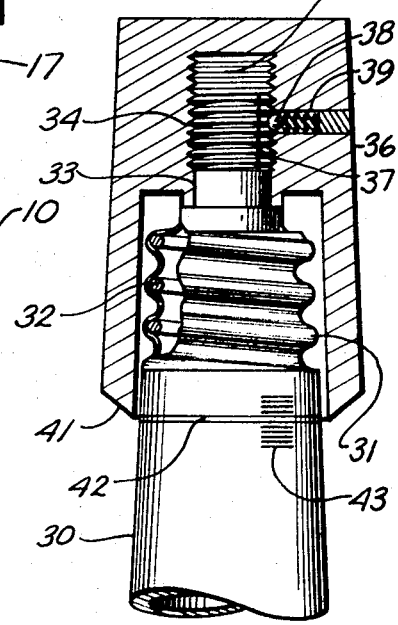
FIG. 4 illustrates a second embodiment of tire pressure indicator incorporating principles of this invention.

FIG. 4 illustrates another and in some ways preferred embodiment of tire valve stem incorporating an integral indicator of tire pressure. As illustrated in this embodiment, there is provided a rubber stem 30 in fluid communication with the interior of the tire, and having a sufficient wall thickness that it is substantially rigid in response to tire inflation pressures. Formed integral with the rubber stem 30 is flexible rubber bellows 31 which instead of parallel convolutions as provided in the bellows of FIG. 1, is formed with helical convolutions. A metal spring 32 is included within the convolutions of the bellows for determining the response of the bellows to tire inflation pressure. A rigid valve mounting member 33 is integrally bonded on the upper end of the extensible bellows 31 and includes an internally mounted conventional tire inflation valve (not shown). Threads 34 are provided on the exterior of the valve mounting member 33 and a cup-shaped cap 36 is screwed on to the threads 34. A longitudinally extending groove 37 (or plurality of grooves) interrupting the threads 34 is engaged by a ball detent 38 mounted in the cap and resiliently biased against the threads or groove by a spring 39. It will be apparent that a detent such as illustrated in FIG. 3 can be employed if desired. When screwed on to the desired extent, a clearance space 40 exists between the valve mounting member 34 and the inside bottom of the cup-shaped cap.

The cap 36 terminates in an edge skirt 41, which when the tire is properly inflated, is adjacent an indicator band 42 extending around the stem 30. A plurality of indicia 43 are also provided on the stem parallel to the indicator band 42.

In order to employ the tire pressure indicator illustrated in FIG. 4, the tire is inflated to the proper pressure in the conventional manner and the cap 36 is screwed on to the valve mounting member 33 until the edge skirt 41 is adjacent the indicator band 42. The detent 38 engaging the groove 37 in the valve mounting member 34 at the end of the stem prevents inadvertent loosening of the cap and maintains it in position with the edge skirt adjacent the indicator band.

When the tire is properly inflated the edge of the cap is adjacent the indicator band and a quick glance shows that the tire is properly inflated. When the tire is under inflated the bellows 31 as controlled by the spring 32 collapses and the skirt 41 of the cap obscures the indicator band 42. The extent of under inflation can be gauged by the indicia 43 which would then appear adjacent the edge 41. Similarly, if the tire is over inflated, the band 42 is completely exposed and additional indicia 43 will also be exposed, thereby indicating the extent of over inflation. A sensitivity of about 2 pounds per square inch is obtained.

It should be noted that when a bellows with helical convolutions is employed, there is some twist of the mounting member and hence cap when the bellows extends in response to increased pressure. By making the convolutions in a steep helix the degree of twist can be significantly increased and the angular change between the cap and stem employed as an indication of tire inflation. If desired, in the embodiment of FIG. 4 the fixed indication can be provided on the stem and rather than a cap with a detent, a cap having a selected internal length corresponding to a given pressure range is screwed down tightly on the valve mounting member. Thus selection of an appropriate cap having a preselected internal length provides the variation needed for different tires and conditions. The pressure indicated by the selected cap is molded into the end of the cap to aid selection and also serve as a guide to service station attendants in providing the proper inflation pressure. This avoids the need of carefully replacing the cap each time since it need only be screwed down tightly.

Although only two embodiments of tire pressure indicator incorporating principles of this invention have been illustrated and described herein, many modifications and variations of this invention will be apparent to one skilled in the art. Thus, for example, instead of providing a plurality of indicia on the stem the edge of the cap can be provided with a plurality of steps so that more or less of a single indicator will be exposed when the tire is over or under inflated. The indicia can indicate a predetermined pressure or give merely a low/safe/high indication. Similarly, since the cap and stem move relative to each other in response to tire inflation pressure, it is feasible to provide a motion amplification by levers, pointers or the like for greater sensitivity in detection or for providing remote sensing of tire pressure as may be desirable in certain public vehicles. The remote sensing is also useful in rigid containers having internal flexible containers for indicating degree of pressurization. Remote signalling is readily provided by causing the extensible portion to actuate an electrical or mechanical contact.

If desired, a cap can be employed with a movable plunger and air passage for filling and checking tires without removing the cap, as is now done with valve stem extenders passing through decorative wheel covers. Another modification is a different adjustable ring from that illustrated in FIG. 1. The modified ring can be an elastic member slidable continuously along the valve stem or incrementally in shallow grooves in the valve stem and staying in position by frictional engagement with the stem. A simple embodiment of this sort uses an O-ring or the like incrementally movable from one shallow convolution on the stem to another. The present apparatus has been described as a substitute for the present valve stem, however, the same principles can be employed in an item that connects to a present type of valve stem in place of the usually used cap.

Many other modifications and variations will be apparent to one skilled in the art, and it is to be understood that within the scope of the appended claims the invention may be practiced otherwise than as specifically described.

What is claimed is:
1. A tire pressure indicator comprising:
a stem having a free end;
a removable cap covering the free end of the stem;
means for providing a measuring indication adjacent an end skirt of the cap;
an elastically extensible rubber bellows responsive to tire pressure integral with a rigid portion of the stem at the free end and extending outwardly therefrom and connectable to the cap at the other end of the bellows for effecting relative movement of the cap and stem, said cap covering the bellows when connected thereto;

means for selectively adjusting the relative positions of the cap and measuring indication for indicating a preselected tire inflation pressure; and means for resisting relative movement of the cap and the measuring indication.

2. A tire pressure indicator as defined in claim 1, wherein the means for adjusting comprises:
a ring mounted on the stem, said ring including the measuring indication; and
detent means on the ring for resiliently resisting relative movement of the ring and the stem.

3. A tire pressure indicator comprising:
a substantially rigid tube in fluid communication with the pressure containing portion of a tire having one end substantially rigidly mounted and the other end free;
an elastically extensible flexible bellow integral with the free end of the tube and extending away from the rigidly mounted end;
a mounting member integral with the elastically extensible bellows at its other end for receiving a valve core;
a measuring indication on the tube; and
a removable cup-shaped cap over the end of the mounting member and extending over the extensible bellows, the open end of the cap being adjacent the measuring indication on the tube when the tire is inflated to a preselected pressure.

4. A tire pressure indicator as defined in Claim 3 wherein the measuring indication is fixed on the tube; and
further comprising means for selectively positioning the end skirt of the cap adjacent the measuring indication when the tire is inflated to a preselected pressure.

5. A tire pressure indicator as defined in claim 4 wherein means for adjusting comprises a cap having a preselected internal length so that the edge skirt of the cap is adjacent the indication when the cap is tightly installed.

6. A tire pressure indicator as defined in claim 3, wherein the elastically extensible member further comprises a resilient spring cooperating with the bellows for responding to tire inflation pressure.

7. A tire pressure indicator as defined in claim 3, wherein the tube further comprises:
an adjustable ring, and wherein the measuring indication is on the ring; and
detent means for resiliently resisting relative movement of the ring and the tube.

8. A tire pressure indicator as defined in claim 3, wherein the measuring indication is fixed on the tube and further comprising means for indicating a preselected tire inflation pressure by selectively positioning an edge skirt of the cap adjacent the measuring indication only when the tire is inflated to the preselected pressure.

9. A tire pressure indicator comprising:
a stem;
a cap mounted on the stem;
a measuring indication on the stem adjacent an end skirt of the cap;
an elastically extensible rubber bellows integral with a rigid portion of the stem at one end and connectable to the cap at the other end for effecting relative movement of the cap and stem; and
means for selectively adjusting the relative positions of the cap and measuring indication for indicating a preselected tire inflation pressure comprising means for selectively positioning the edge skirt of the cap adjacent an indication when the tire is inflated to a preselected pressure; and
a detent for resiliently resisting relative movement of the cap and an end of the bellows.

10. A tire pressure indicator as defined in claim 9, wherein the cap extends over the elastically extensible member, thereby shielding the extensible member from external influences.

11. A tire pressure indicator comprising:
a substantially rigid tube in fluid communication with the pressure containing portion of a tire;
an elastically extensible member connected to the end of the tube;
a mounting member connected to the elastically extensible member for receiving a valve core;
a measuring indication on the tube;
a cup-shaped cap mounted on the mounting member and extending over the extensible member; and
means for indicating a preselected tire inflation pressure comprising
means for selectively positioning an edge skirt of the cap relative to the measuring indication on the mounting member when the tire is inflated to a preselected pressure; and
detent means for resiliently resisting relative movement between the cap and mounting member.

* * * * *